J. W. LAMB.
Handles for Sheet-Metal Ware.
No. 137,848.  Patented April 15, 1873.
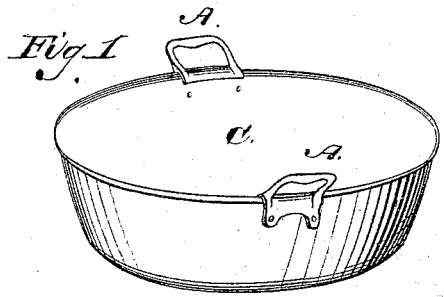
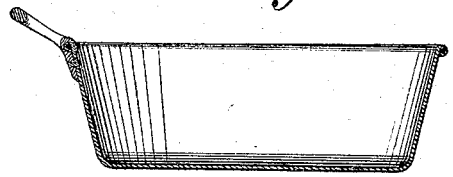
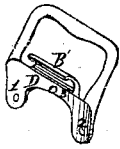
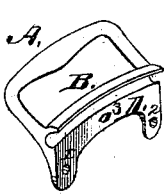
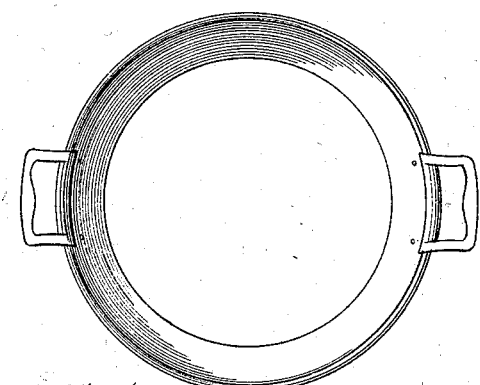
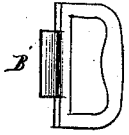
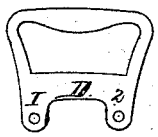
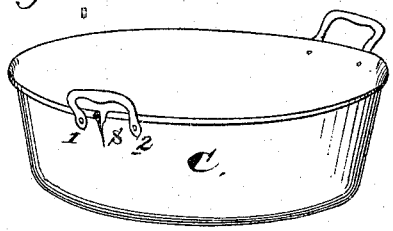
Witnesses,
S. E. Babcock
A. E. Wooster
Inventor,
J. Warren Lamb

UNITED STATES PATENT OFFICE

J. WARREN LAMB, OF TROY, NEW YORK.

IMPROVEMENT IN HANDLES FOR SHEET-METAL WARE.

Specification forming part of Letters Patent No. 137,848, dated April 15, 1873; application filed January 3, 1873.

*To all whom it may concern:*

Be it known that I, J. WARREN LAMB, of the city of Troy, in the county of Rensselaer and State of New York, have invented certain Improvements in Handles of Tin and Sheet-Metal Vessels, of which the following is a specification:

Nature and Objects of the Invention.

My invention consists of a handle cast or constructed of metal with a cross bed plate or section, with a groove or nib extending across, or partly across, the cross-section, which is combined with and riveted on tin or sheet-metal-ware vessels, inclosing in their points of contact with the vessel the junction of the wire that is usually beaded in the rim.

This invention is intended more especially for seamless ware, to cause a stronger and firmer adhesion of the handle to the vessel, and to prevent or diminish in a greater degree than by handles in ordinary use the liability of fracture or breaking of the vessel from the junction of the wire in beaded rim downward when in use in storage or in shipment, when piled one in the other, and to make the vessels stronger in handling the same.

Description of the Accompanying Drawing.

Figure 1 is a general perspective view of my handle attached to a pan. Fig. 2 is a section of the same. Fig. 3 is a plan view. Fig. 4 is an enlarged section of the handle. Fig. 5 is a perspective view of the handle, showing groove across the same. Fig. 6 is a perspective view of the same, showing only a nib or short groove. Fig. 7 is a plan view of Fig. 6. Fig. 8 is a perspective view of the pan, showing point of fracture from junction of wire bead downward and between the prongs of the handle, as usually made and attached. Fig. 9 is an elevation of the inclosed without a groove across the same.

General Description.

C, Fig. 1, is a pan with my improved handle A attached. C, Fig. 8, is a pan with an ordinary handle attached, showing fracture from junction of beaded wire downward. B is the cross-groove of the inclosed handle. B' is a section of the same. D is the cross-plate of the handle. 1 and 2 are the rivet-holes of the same, although with my improved handle a third rivet-hole, marked 3, Fig. 5, may be made, if desired.

In sheet-metal-ware vessels, and especially with heavy seamless ware, the handles heretofore used, shown in Fig. 8, are riveted to the upper and outer surface of the pan, just below the bead and on each side of the junction of the wire within the bead. The points of contact of the handle are only at the places of riveting 1 and 2; and, when in use, the handle of the old form is liable to become detached, or in storing or shipping the pans in bulk the weakest part—that is, the junction of the ends of the beaded wire—will usually spread apart, and a fracture result, as shown at S, Fig. 8. For strengthening this weak place and to prevent fracture, and at the same time to have a handle to bind and inclose the ends of the beaded wire, my invention is found to be most effective in operation.

My improved handle is cast or made in one inclosed piece of any required material, although I prefer to cast the same of malleable iron, as shown in Figs. 5, 6, and 9; or the manufacturer may form the inclosed handle by making the cross-plate D a separate plate, to be riveted to the two sides of the handle and to the vessel, when the points of contact of the inclosed handle and vessel, as combined, are soldered or retinned in the tinning-vat, as hereinafter set forth. In the casting of the cross-plate D of the inclosed handle care should be taken that the same conforms to the shape of the vessels upon which it is to be placed.

The pan or vessel is constructed or stamped out in a die in the usual manner, the wire inclosed in the beaded rim, and the workman, by a mark on the pan, indicates the junction of the ends of the beaded wire. Then my inclosed handle is placed in contact with the outer and upper surface of the pan, so that the junction of the wire comes nearly at the center of the cross-piece D; the nib B and B' is so placed as to pass over and partially inclose or hug the bead; the rivets are put through and battened down on the inner side of the vessel. The vessel with the inclosed attached handle is then immersed in the tinning-vat, and the handle becomes thoroughly soldered or united to the pan or vessel, so that the space between the rivets and sides of the inclosed handle, where the principal strain or pressure is brought to bear in use, storage, or shipping, becomes the strongest portion of the pan, and danger of breakage or fracture in packing the pans in bulk is obviated; and my improved handle, in combination with a vessel, and especially in seamless ware, which is more liable than other ware to fracture easily from the stamping process, becomes greatly strengthened for all purposes.

*Claim.*

An inclosed handle for sheet-metal ware, having its base grooved for the reception of the edge of the vessel, and rigidly attached thereto, substantially as described.

J. WARREN LAMB.

Witnesses:
S. E. BABCOCK,
A. E. WOOSTER.